Nov. 11, 1958          J. HANSEN          2,859,563
METHOD AND APPARATUS FOR MAKING SLICER BLADES
Filed April 27, 1956          4 Sheets-Sheet 1
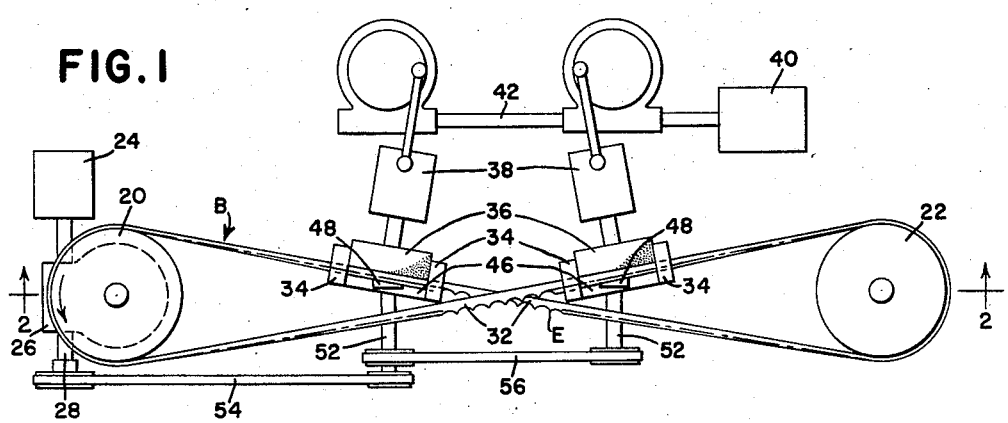
FIG. 1
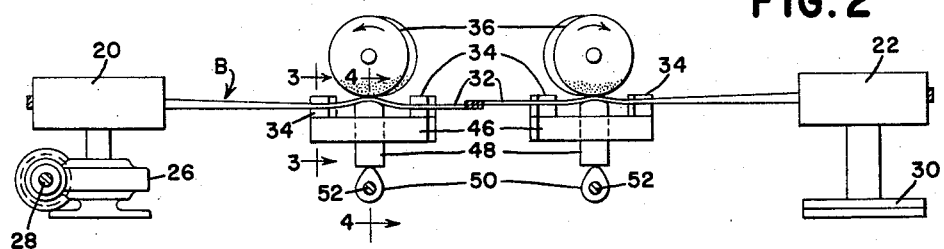
FIG. 2
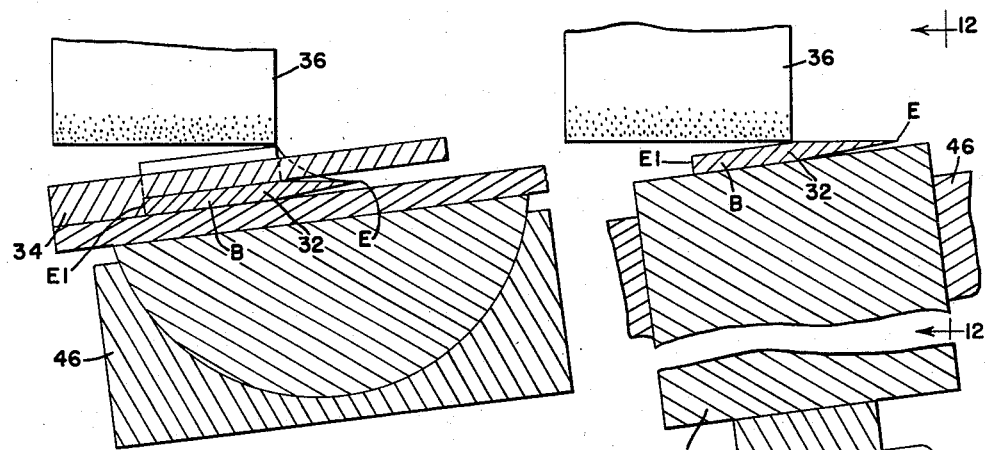
FIG. 3
FIG. 4
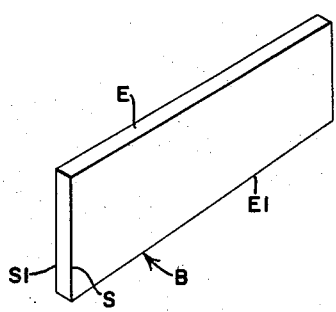
FIG. 5
*INVENTOR.*
JOHN HANSEN
BY
ATTORNEY

INVENTOR.
JOHN HANSEN
ATTORNEY

Nov. 11, 1958  J. HANSEN  2,859,563
METHOD AND APPARATUS FOR MAKING SLICER BLADES
Filed April 27, 1956  4 Sheets-Sheet 3
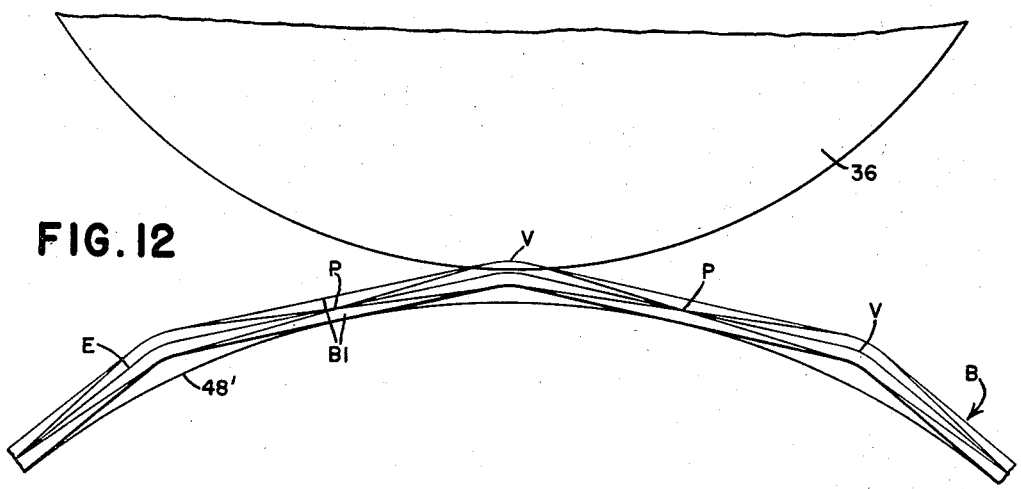
FIG. 12
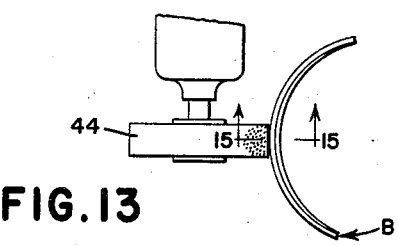
FIG. 13
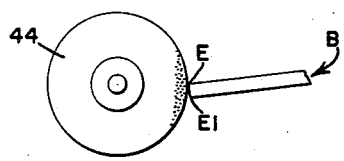
FIG. 14
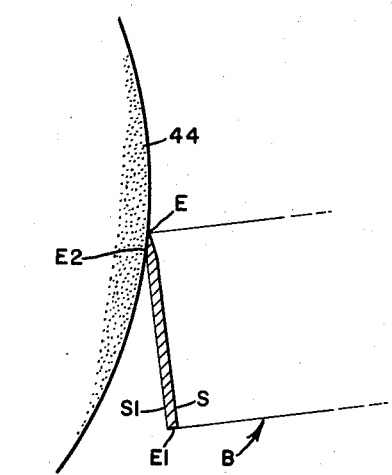
FIG. 15
*INVENTOR.*
JOHN HANSEN
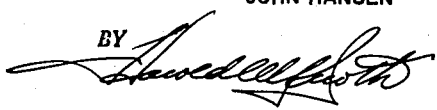
ATTORNEY Nov. 11, 1958         J. HANSEN         2,859,563
METHOD AND APPARATUS FOR MAKING SLICER BLADES
Filed April 27, 1956         4 Sheets-Sheet 4

INVENTOR.
JOHN HANSEN

BY
ATTORNEY

United States Patent Office 2,859,563
Patented Nov. 11, 1958

2,859,563

METHOD AND APPARATUS FOR MAKING SLICER BLADES

John Hansen, Bettendorf, Iowa

Application April 27, 1956, Serial No. 581,105

9 Claims. (Cl. 51—38)

This invention relates to the art of slicer blades and more particularly to methods and apparatus for making same.

The invention finds particular utility in the manufacture of slicer blades of the endless type used in bakeries for slicing loaves of bread. A typical slicer machine will include several endless blades, depending upon the number of slices into which the loaf is to be cut, and these are trained about a pair of drums rotating on parallel axes, but the blades are crossed so that at the intersection or cross the blade portions run and are guided in parallel planes normal to the drum axes. The intersections of the blade portions are in the path of loaf travel and the loaves are sliced as they are passed through the crossed blades. There are of course smaller machines using short reciprocating blades but in the larger production bakeries, endless blades are used almost exclusively. In either event, the type of cutting edge that has become the most popular is that which is uniformly scalloped to afford alternate peaks and valleys as distinguished from a perfectly straight cutting edge. In the past, blades following the pattern set in the U. S. patents to Hansen 2,002,812 and 2,082,832 were almost universally adopted, but more recently the desire to hone the blades while in the slicing machine resulted in the introduction of a modified form of blade in which the cutting edge is thinned out by secondary bevels on one or both sides, such as in the U. S. patent to Hansen 2,596,851. Although blades of this type lend themselves much better to honing in situ, it has been found that there is still room for improvement, particularly along the lines of eliminating sharp corners at the junctions of the various curved and plane surfaces involved in a scalloped cutting edge. Even in a blade of the type disclosed in the last mentioned Hansen patent, the intersections of the curves of the valleys with the plane or hollow ground surfaces of the secondary bevels presents relatively "square" corners which, although materially improving honing possibilities over the older blades, still presented obstacles to utmost honing efficiency. According to the present invention, this obstacle is removed by a novel method of manufacture which does not involve an additional steps as might be expected to be necessary to remove the "square" corners. Instead, there is introduced into the bevelling operation a timed or periodic blade deflection which causes the removal of additional blade material along the valleys, resulting in smooth rounded junctions where "square" corners previously existed. The invention features alternate methods, and accordingly an apparatus for each, of accomplishing this result at virtually no additional expense. It is a feature of the invention to provide an apparatus that may be converted from existing manufacturing machines to produce the new type of blade simply, economically and expeditiously.

It is an object of the invention to accomplish the bevelling of the blade by a grinding operation in which the grinding marks are parallel to the length of the blade.

The foregoing and other important objects and desirable features inherent in and encompassed by the invention will become apparent as preferred embodiments of the invention are disclosed in detail in the ensuing specification and accompanying sheets of drawings, the several figures of which are described immediately below.

Figure 1 is a somewhat schematic plan view of an apparatus for performing the method of making the slicer blades.

Figure 2 is a front view of the machine or apparatus, partly in section as seen along the line 2—2 of Figure 1.

Figure 3 is an enlarged section on the line 3—3 of Figure 2.

Figure 4 is an enlarged section on the line 4—4 of Figure 2.

Figure 5 is an enlarged fragment of a blade blank.

Figure 12 is an enlarged fragmentary view as seen along the line 12—12 of Figure 4.

Figure 13 is a plan view of one form of scalloping apparatus.

Figure 14 is an elevation of the same.

Figure 15 is an enlarged section on the line 15—15 of Figure 13.

Figure 6:
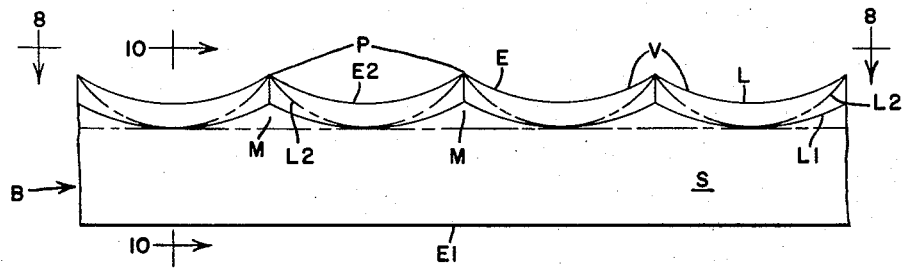
Figure 6 is an enlarged elevation of a scalloped blade.

Figures 1 and 2 illustrate a basic apparatus representative of that which will embody the means instrumental in performing the bevelling step of the method for finishing the band or blade after the scalloping operation has been performed by any suitable method, of which that of the prior Hansen Patent No. 2,002,812 is typical. However, for present purposes it is deemed expedient to refer first to Figures 1 and 2 for an overall explanation of what is involved, in which regard the invention will be disclosed in terms of its application to endless-band type blades; although, beneficial results will be achieved in the manufacture of short blades intended for use in reciprocating slicer machines.

The endless steel band or blade is identified in its entirety by the letter B and is shown in Figures 1 and 2 as being crossed and trained about a driving drum 20 and an idler drum 22, the former of which is powered as by an electric motor 24 and worm and gear mechanism (not shown) contained in a housing 26 and including a shaft 28. The idler drum 22 is mounted on any suitable carriage or support as at 30 for selective movement toward and away from the other drum so as to vary the tension on the band B and so as to enable the mounting and dismounting of the band. Although the axes of the drums are parallel and upright, intermediate portions of the band at the intersection or cross thereof will be generally horizontal, as at 32, and to further augment this relationship for the bevelling operation the portions 32 are appropriately controlled or guided by guides 34. It is not necessary that the band be carried as shown, but the illustrated apparatus has lent itself well to commercial production of bands and is therefore preferred.

In a slicer machine, in which a plurality of bands are used, each band will be installed on slicer drums in the manner of the band mounting on the apparatus or machine of Figures 1 and 2, the several intersections of the straight band portions affording a bread-slicing zone, which is immaterial here except as of environmental interest.

As the band is carried by the drums 20 and 22 for movement as indicated, the portions 32 are guided at 34 for presentation to bevel-forming means—here a pair of abrasive or grinding wheels 36—which form bevels on both sides of the band. Each wheel 36 is driven by a motor 38 and is mounted for reciprocation crosswise of the length of the associated straight portion 32 of the band simply for the purpose of preventing the wearing of a groove in the wheel. It will be understood that one wheel operates on one side of the band and the other wheel performs the same function on the other side. Each guide 34 is adjustable to select the desired angle for the bevel (Figure 3), in which case any suitable adjustable means may be employed. Reciprocation of the wheels 36 may be effected as desired, the motor 40 and drive mechanism 42 shown in Figure 1 being typical only. It is important to note that the axes of rotation of the wheels 36 are transverse to the straight portions of the band and hence the grinding marks made thereon will be parallel to the length of the band. This improves the slicing efficiency of the blade as well as its ability to be honed. It should be appreciated at this point that relatively small amounts of material are dealt with here, but the treatment of the blade according to the invention is none the less of definite character.

Before the band is placed on the machine of Figures 1 and 2, and before it is scalloped, it exists as a straight strip of band material of uniform width and thickness, having opposite straight edges E and E1 and opposite parallel flat sides S and S1 (Figure 5). The edge E is destined to become a scalloped, beveled cutting edge and for this purpose an appropriate length of strip or band stock is first scalloped by the method, for example, shown in Figures 13, 14 and 15, which figures are taken largely from the prior art as represented by the Hansen Patent 2,002,812; although, any other scalloping method may be used.

Figure 7:
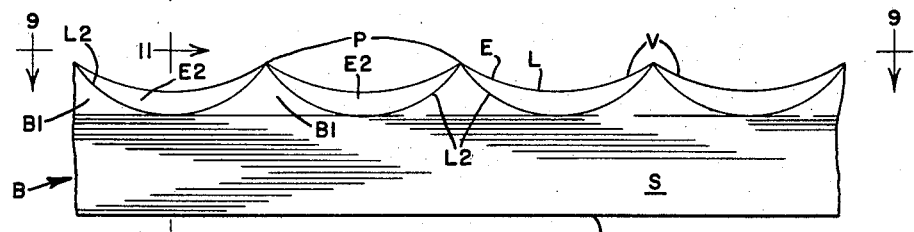
Figure 7 is an enlarged elevation of a scalloped and beveled blade.
Figure 8:
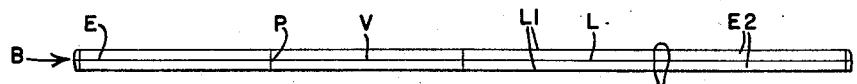
Figure 8 is a plan of the blade of Figure 6.
Figure 9:
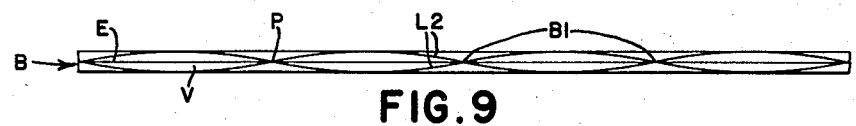
Figure 9 is a plan of the blade of Figure 7.
Figure 10:
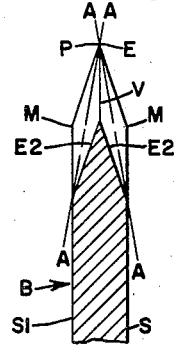
Figure 10 is an enlarged section on the line 10—10 of Figure 6.
Figure 11:
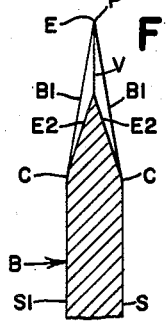
Figure 11 is an enlarged section on the line 11—11 of Figure 7.

In the Hansen method shown, the band strip is curved as shown and is presented to a grinding wheel 44. The presentation is made at an angle (Figure 15) and is repeated (see also Hansen Patent 2,082,832) in uniform fashion and at both sides of the strip so that the strip after the scalloping operation has its edge E formed as a cutting edge characterized by alternate and uniform peaks or points P and valleys or gullies V (Figure 6). The curvature of the valleys results from the grinding away of portions of the band metal and in view of the angle of presentation of the strip to the wheel 44, the cutting edge will be sharp on the basis of the convergence of opposite side edge portions E2, E2 (Figure 10). As a matter of interest, a blade as shown in Figure 6 had at one time been considered a finished product and even today will give outstanding results in slicer machines. However, it does have a disadvantage in that it does not lend itself readily to honing in situ (with the bands in place in the slicer machine), primarily because of the relatively large amounts of metal at M, which occur at the sides of each peak P. Accordingly, a second operation of beveling is desired to thin out the blade at one or both sides, such as after the fashion of Hansen 2,596,851. In that case, as well as according to the present invention, the removal of these excess portions or "humps" and the comparable thinness of the band along the cutting edge E results in bevels B1 at each of the opposite sides of the band (Figures 7 and 11). The difference in section between the plain scalloped blade and the scalloped and beveled blade can be seen by comparing Figures 10 and 11. In Figure 10, the dot-dash lines A—A represent the planes of the bevels B1 and illustrate the amount and location of material removed. The difference in elevation can be appreciated by a comparison of Figures 6 and 7.

In Figure 6, which is an elevation of a plain scalloped blade, the edges of the valley are defined by substantially concentric arcs L and L1 and it will be seen that the lower arc L1 stops short of the tip of the peak in the zone M. However, when the portions M are removed by a beveling operation as in Hansen 2,596,851, the lower arc L1 is replaced by an eccentric arc L2 (Figure 7) which terminates at the point of the peak. The arcs L2 are shown as broken lines in Figure 6 for comparative purposes.

It is at this point that the merit of the present invention appears. In blades of the type of Hansen 2,596,851, the lines or arcs L2 are sharp or abrupt and present relatively "square" corners at the intersections of the valley bevels E2, E2 with the lengthwise or secondary bevels B1, B1, which constitute, like but in a lesser degree than the "humps" M, obstacles to efficient honing. According to the present invention, the "sharp" arcs L2 are removed and instead the critical junctions or intersections are smoothly contoured as at C (Figures 16–19). This novel and beneficial result is achieved, in either of the alternative systems disclosed here, by causing uniformly intermittent displacement of the blade into the bevel-forming means (grinding wheels 36) at the valley portions of the band, thus effecting the removal of additional band material at those portions. Stated simply, prior beveling methods, such as are capable of producing beveled blades of the type of Hansen 2,596,851, rely on passing a scalloped blade past wheels such as 36 in a straight-line path so that the bevel is uniform throughout the blade. In such methods, metal is removed primarily at M but the result is the sharp lines as at L2. By laterally deflecting the blade at the valley portions, as the blade passes the wheel 36, an undulating motion of the band relative to the wheel (or vice versa) is achieved, causing the wheel to grind deeper at the valleys. In this respect, it should be noted that the expression "undulating" is relative, because the blade or band may be positively and periodically deflected, in which case the band is actually moved bodily toward and away from the wheel 36, or the band may be curved about an appropriate surface to cause temporarily fixed lateral displacement of the valley portions into closer proximity to the wheel than the peak portions.

For example, Figures 1 and 2 show that each guide 34 includes a table portion 46 over which the band portion 32 passes as it runs through the guide. Each table has projectible upwardly therethrough a plunger or equivalent means 48 which is reciprocated by a cam 50 fixed to a shaft 52 and driven by an appropriate chain 54 from the drive shaft 28. The cam shaft for the other plunger is driven by a chain 56 from the first cam shaft 52. If these plungers were flat on top and fixed to their tables 46, they would simply complement their guides 34 and straight bevels would be achieved on the band. However, as already stated, each plunger reciprocates and as it does so it deflects the band relative to its wheel 36.

Each plunger is so timed and driven that when it is in its down position, a peak portion of the band is in contact with the wheel 36 and accordingly the portion at M will be ground off. If the plunger remained in its down position, the result would be the production of a straight bevel as in Hansen 2,596,851, since, as the next valley portion comes into contact with the wheel, the degree of contact is less because of the missing portion of the band on account of the scallop. In the present case, however, contact between the side of the band at the valley portion is increased, which thus "rounds" or "contours" the arc L2 into the smooth junction C. This result is accomplished by either of two means or a combination of both.

Figure 17:
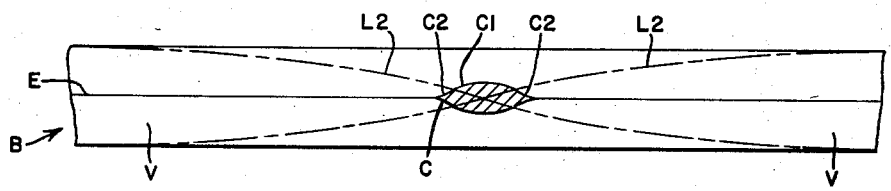
Figure 17 is a section on the line 17—17 of Figure 16.
Figure 18:
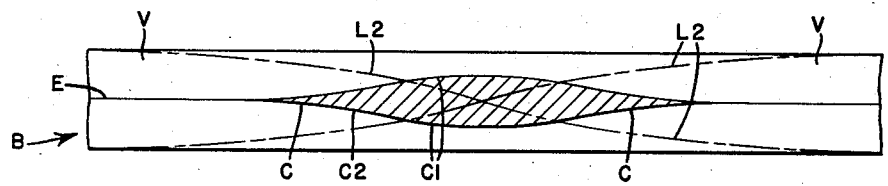
Figure 18 is a section on the line 18—18 of Figure 16.
Figure 19:
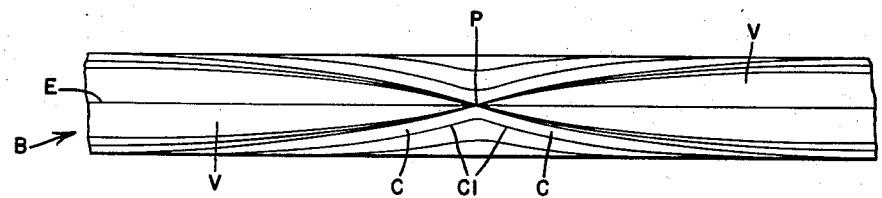
Figure 19 is a plan of Figure 16.
Figure 16:
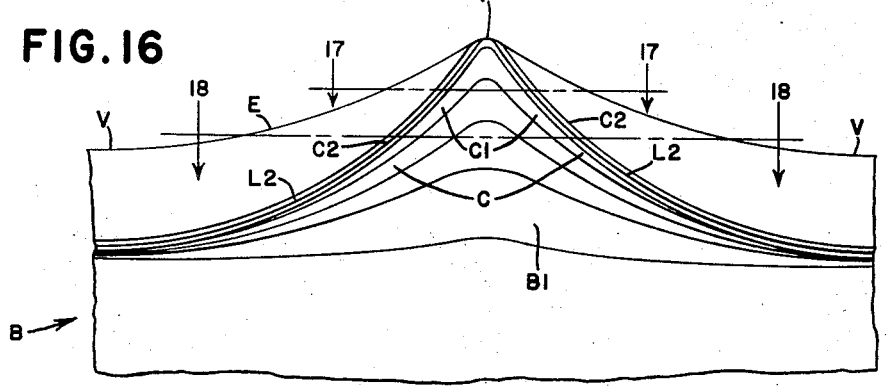
Figure 16 is an enlarged fragmentary elevation of a completed blade.

The cam 50, in displacing and retracting its plunger 48, alternately displaces the band from and causes return of the band to a defined path. Upon displacement, or deflection, the side of the valley is ground along the line L2 to afford the junction C. The result is that the side of the peak is ground convex and the side of the valley is ground concave, best represented respectively at C1 and C2 in Figures 17–19. The contour thus effected varies of course from the base to the point of each peak. This is represented by the contour lines in Figures 16–19. It should be understood that these are not intended as shade lines and that the figures referred to are much enlarged over actual size. Consequently, the graduations are of a finer nature than shown but are nevertheless of extreme importance. In Figures 17 and 18, the arcs L2 are included in dot-dash lines to show the difference that the contour C makes. The reference character L2 in Figure 16 represents the arc L2 so that the graduations of the contour C may be compared thereto.

It should be noted moreover that the top of each plunger 48 is rounded on an arm 48', as best shown in the enlargement in Figure 12. Hence, as the band is bent around the arc 48' and confined by the guides 34 at each side of and at lower levels than the arc, the bent band cannot conform exactly to the true arc, because its resistance to bending is less at the valley portions than at the peak portions, since the band is respectively weaker and stronger at those portions on account of relative weakening of the band section by the scalloping operation. Therefore, the sides of the peaks will tend to hug the arc and the sides of the valleys become displaced radially away from the arc. This will be readily comprehended on the basis of the general proposition that a circle is made up of a series of straight lines of infinite length. Because of the differences in section of the band at the peaks and valleys, the straight lines become finite. Thus, as the band passes beneath its wheel 36, the sides of the valley are closer to the wheel than the sides of the peaks. The relative proximity varies as the band passes on its way and hence results in the aforesaid convexity of the peak sides and concavity of the valley sides to afford the contour at C.

Figure 12 is intended also to represent the alternative system in which the plunger 48 is not reciprocated but is fixed, and the design of its arc 48' and location relative to its guides 34 accomplishes the required deflection of the band at the valley portions. In such fixed design, the band presents alternate deflected portions to the wheel 36 at its valleys as the band is drawn through the guides 34 and over the arc 48'. The cam actuation added to the arc function varies the possibilities of achieving any desired result. In short, a simple cam-actuated plunger without the arm 48' or a fixed plunger having the arm 48' or variations thereof would produce results within the scope of the invention. The combination of the arm 48' and the cam-actuation presents control factors that may be adjusted to produce convex-concave relationships in the contour C as desired. For example, the shape of the cam 50 could be calculated to produce results different in degree from those shown. Likewise, the radius of the arc could be modified. Either alteration is contemplated, singly or in combination.

The solution of the honing problem according to this invention may be best understood on the basis of a brief description of honing as applied to bands in situ. In such cases, the slicer machine is operated, usually at its normal speed, and the bands are honed in or near the slicing zone. Conventional hones are manually applied to opposite sides of the cutting edge as the band moves. Now, if the blade were not scalloped and had perfectly straight and flat opposite sides along its cutting edge, honing would be a simple proposition. But each irregularity introduced into the band complicates honing. As will be appreciated, the older blades, as in Hansen 2,002,812, had the "humps" M as irregularities. Although the later blades, as in Hansen 2,596,851 eliminated the humps they still had the sharp arcs L2. Both of these caused excessive vibrations of the bands and abnormal wear of the hones. As can be appreciated, the honing operation on moving sharp blades presents an element of danger unless great care is exercised. The elimination of such problems as those noted, in addition to others incident thereto, facilitates honing and therefore minimizes the hazards and increases the life of the hones as well as resulting in better and more efficient honing.

Features of the invention other than those enumerated will occur to those versed in the art, as will variations of the method and apparatus disclosed, all of which may be achieved without departing from the spirit and scope of the invention.

What is claimed is:

1. Apparatus for beveling at least one side of a cutter blade of the type having a sharpened scalloped cutting edge made up of alternate peaks and valleys which thus render the blade relatively weaker at the valleys and relatively stronger at the peaks as respects resistance thereof to bending about an axis transverse to its length, said apparatus comprising: supporting structure; bevel-forming means on said structure for removing blade material at said one side of the blade and lengthwise thereof so as to produce at said one side and in the blade portion containing the peaks and valleys a lengthwise bevel for thinning out the peaks toward the cutting edge; blade-positioning means for carrying the blade with said one side in constant engagement with the bevel-forming means; means for moving the positioned blade and the bevel-forming means relatively and lengthwise of the blade to incur the aforesaid bevel; and said positioning means including an element effective to increase the engagement of said one side of the blade with the bevel-forming means at the weaker valley portions as the blade and bevel-forming means are moved relatively and lengthwise of the blade so as to remove additional blade material at said side of the blade primarily at the junctions of the peaks with the respective valleys whereby the bevel undulates from valley to peak to valley and presents a convex side surface on each peak at said side of the blade.

2. The apparatus defined in claim 1, in which: the bevel-forming means comprises an abrasive wheel rotatable about an axis transverse to the length of the blade so that marks left by said wheel on the beveled and convex surfaces are directed lengthwise of the blade.

3. The apparatus defined in claim 1, in which: the element of the blade-positioning means is operative to cause bending of the blade about a bending axis at a selected fixed distance from the bevel forming means, said bending axis being so disposed as to cause the side of the blade engaged by the bevel-forming means to assume a convex form about said axis whereby the valley and peak portions occur respectively as high and low spots on said side.

4. The apparatus defined in claim 1, in which: the element of the blade-positioning means includes a curved surface at the side of the blade opposite to the one side engaged by the bevel-forming means and formed about an axis at a selected fixed distance from the bevel-forming means, and said blade-positioning means includes further elements causing the blade to bend around said surface as the strip and bevel-forming means are moved relatively as aforesaid so that the relatively weaker valley portions become displaced radially outwardly from said surface while the stronger peak portions contact said surface, whereby the peaks and valleys respectively present low and high spots of said one side of the blade to the bevel-forming means.

5. The apparatus defined in claim 1, in which: the element of the blade-positioning means engages the strip at the side of the blade opposite to the side engaged by the bevel-forming means, and said element is intermittently movable toward and away from the bevel-forming means respectively in timed relation to the passage of valleys and peaks relatively past said bevel-forming means so as to increase the engagement of said valley portions with said bevel-forming means.

6. In the art of beveling a cutter blade made from an elongated relatively thin flexible strip of blade material having opposite flat sides, a back edge and a sharpened scalloped cutting edge made up of alternate beveled peaks and valleys which thus render the blade relatively weaker at the portions thereof in the valleys and relatively stronger at the portions thereof at the peaks as respects resistance of the blade to bending about an axis transverse to its length: the method of beveling at least one side of the blade lengthwise thereof and additionally to the beveled peaks and valleys to produce thereon a beveled surface converging to the cutting edge, comprising passing the blade lengthwise past and with said one side in engagement with bevel-forming means, and simultaneously causing the engagement of said one side of the blade with the bevel-forming means to increase intermittently in timed relationship with the presentation of the valley portions to the bevel-forming means so as to cause the beveled surface to undulate lengthwise of the blade.

7. In the art of beveling a cutter blade made from an elongated relatively thin flexible strip of blade material having opposite flat sides, a back edge and a sharpened scalloped cutting edge made up of alternate beveled peaks and valleys which thus render the blade relative weaker at the portions thereof in the valleys and relatively stronger at the portions thereof at the peaks as respects resistance of the blade to bending about an axis transverse to its length: the method of beveling at least one side of the blade lengthwise thereof and additionally to the beveled peaks and valleys to produce thereon a beveled surface converging to the cutting edge, comprising passing the blade lengthwise past and with said one side in engagement with a bevel-forming abrasive wheel that rotates about an axis transverse to the length of the blade, and simultaneously causing the engagement of said one side of the blade with the wheel to increase intermittently in timed relationship with the presentation of the valley portions to the wheel so as to cause the beveled surface to undulate lengthwise of the blade.

8. In the art of beveling a cutter blade made from an elongated relatively thin flexible strip of blade material having opposite flat sides, a back edge and a sharpened scalloped cutting edge made up of alternate beveled peaks and valleys which thus render the blade relatively weaker at the portions thereof in the valleys and relatively stronger at the portions thereof at the peaks as respects resistance of the blade to bending about an axis transverse to its length: the method of beveling at least one side of the blade lengthwise thereof and additionally to the beveled peaks and valleys to produce thereon a beveled surface converging to the cutting edge, comprising passing the blade lengthwise past and with said one side in engagement with bevel-forming means, and simultaneously bending the blade about a bending axis transverse to the length of the blade and at a selected fixed distance from the bevel-forming means to cause the blade to assume a curved form in which said one side thereof is convex to the bevel-forming means and the relatively weaker valley portions are displaced radially farther than the peak portions from said axis so as to present, respectively, high and low spots to the bevel-forming means so as to cause the beveled surface to undulate lengthwise of the blade.

9. In the art of beveling a cutter blade made from an elongated relatively thin flexible strip of blade material having opposite flat sides, a back edge and a sharpened scalloped cutting edge made up of alternate beveled peaks and valleys which thus render the blade relatively weaker at the portions thereof in the valleys and relatively stronger at the portions thereof at the peaks as respects resistance of the blade to bending about an axis transverse to its length: the method of beveling at least one side of the blade lengthwise thereof and additionally to the beveled peaks and valleys to produce thereon a beveled surface converging to the cutting edge, comprising passing the blade lengthwise past and with said one side in engagement with a bevel-forming abrasive wheel that rotates about an axis transverse to the length of the blade, and simultaneously bending the blade about a bending axis transverse to the length of the blade and at a selected fixed distance from the wheel to cause the blade to assume a curved form in which said one side thereof is convex to the wheel and the relatively weaker valley portions are displaced radially farther than the peak portions from said bending axis so as to present, respectively, high and low spots to the wheel so as to cause the beveled surface to undulate lengthwise of the blade.

References Cited in the file of this patent
UNITED STATES PATENTS

| | | |
|---|---|---|
| 263,123 | Decker | Aug. 22, 1882 |
| 2,183,995 | Mautz | Dec. 19, 1939 |